May 12, 1953 F. P. ZAFFARANO 2,638,511

PULSE STRETCHING PREVENTION CIRCUIT

Filed April 27, 1949 3 Sheets-Sheet 1

INVENTOR.
F. P. Zaffarano

BY Neil D. Preston,
HIS ATTORNEY

May 12, 1953 F. P. ZAFFARANO 2,638,511

PULSE STRETCHING PREVENTION CIRCUIT

Filed April 27, 1949 3 Sheets-Sheet 2

INVENTOR.
F. P. Zaffarano
BY
Neil D. Preston
HIS ATTORNEY.

May 12, 1953 F. P. ZAFFARANO 2,638,511

PULSE STRETCHING PREVENTION CIRCUIT

Filed April 27, 1949 3 Sheets-Sheet 3

INVENTOR.
F. P. Zaffarano
BY Neil D. Preston
HIS ATTORNEY.

Patented May 12, 1953 2,638,511

UNITED STATES PATENT OFFICE 2,638,511

PULSE STRETCHING PREVENTION CIRCUIT

Frank P. Zaffarano, Rochester, N. Y., assignor to General Railway Signal Company, Rochester, N. Y.

Application April 27, 1949, Serial No. 89,873

2 Claims. (Cl. 179—171)

Figure 1:
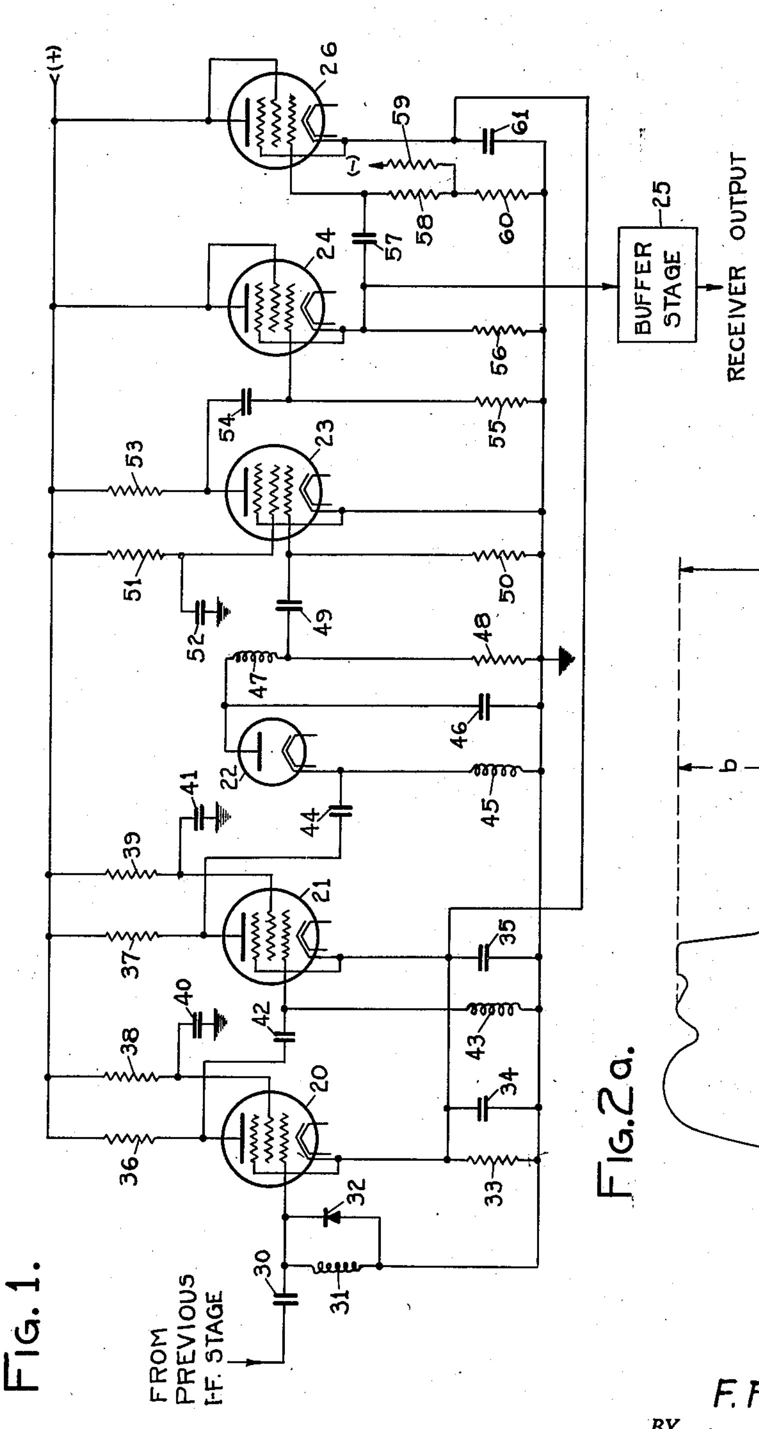
Figure 2A:
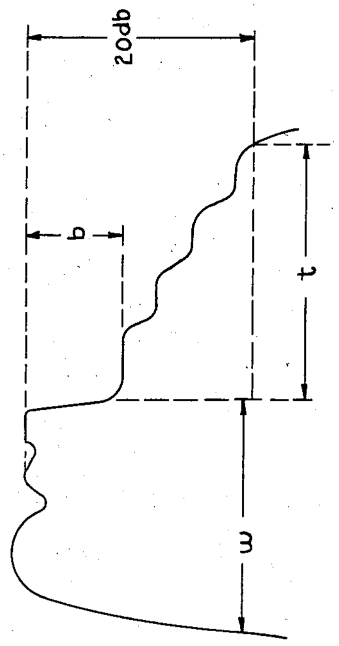
Figure 2B:
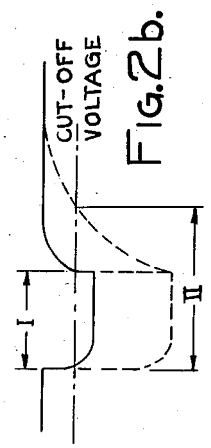
Figure 3:
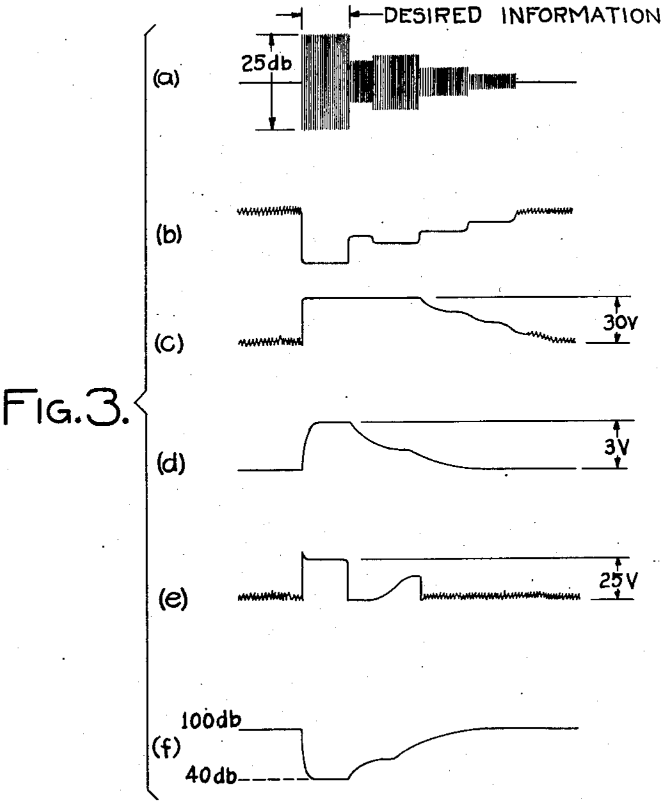

In pulse modulation communication systems wherein the width of the pulse transmitted and received is varied to denote intelligence, it is extremely important that the pulse width received by the receiver be maintained constant throughout its passage through the receiver. In addition, it is essential that the receiver distinguish between pulses received directly from the transmitter and echoes, which are not received directly from the transmitter but are reflected from some surface adjacent or intermediate the transmitter and receiver, and therefore arrive at the receiver shortly after the receipt of the corresponding directly received pulse. This invention overcomes both difficulties, and prevents pulse stretching in a pulse system receiver by distinguishing between directly-received pulses and echoes and by controlling the receiver to prevent any increase in the width of each pulse received during its passage through the receiver. This is accomplished by a control circuit responsive to the amplitude of the direct pulses received by the receiver, which controls the gain of the receiver very rapidly as the pulse begins to be received and then maintains the receiver sensitivity at this level for a controlled period after the directly-received pulse input ends, this latter function serving to selectively distinguish between directly-received pulses and echoes. This invention and its operation will be more apparent from the following detailed description when taken with the accompanying drawings, in which:

Fig. 1 shows a portion of a pulse receiver including a control circuit according to this invention;

Figs. 2*a* and 2*b* illustrate the manner in which pulse stretching occurs;

Fig. 3 shows various waveforms with respect to time illustrating a direct pulse and its corresponding echoes as received by the receiver, and the operation of the receiver in response thereto under the control of the control circuit of this invention; and Figs. 4–7 show various waveforms illustrating the operation of a conventional receiver and one modified by the control circuit of Fig. 1 when similar pulses are applied to both.

Pulse stretching can occur in a pulse receiver in two ways, as outlined above:

(*a*) By the addition to the desired direct signal of pulses arriving via another path (other than the direct one) with a slightly different and greater transmission time. This is called echo addition.

(*b*) By distortion in the receiver itself due to overloading of the I.-F. amplifiers, overloading of the video amplifiers, and narrow band width of the receiver components.

In Fig. 2*a* is shown a waveform typical of an actual pulse input applied to a pulse receiver. It comprises a direct pulse distorted by multiple path reception. The break which follows the ending of the direct pulse is denoted by *b*. The width of the direct pulse is denoted by *w*, and the time after the break required for the intensity to decay to 20 db below the level of the direct radiation is denoted by *t*. For any given relative position of a receiver and a transmitter it has been found that the values of *b* and *t* are independent of the pulse width *w* within the range from 2 to 16 microseconds, and that *b* is never less than about 10 db. Time *t* varies from ½ microsecond when there are few echoes to as much as 5 microseconds when strong and persistent echoes occur. Indeed, while not shown in Fig. 2*a*, echoes 40 db down from the level of direct radiation have been observed for as long as 15 microseconds after the arrival of the direct pulse in extreme cases of multiple path reception.

In Fig. 2*b* is shown the manner in which pulse stretching may occur due to distortion in the receiver itself. If a broad band I.-F. amplifier is used, which applies a truly rectangular negative pulse of width I to the detector, the resultant output from the detector will be the pulse whose shape is shown in solid lines in Fig. 2*b*. The rounded edges are due to the finite band width of the detector. This pulse will vary in amplitude as the signal strength of the incoming signal varies up to the point where, for example, the last I.-F. amplifier stage overloads. The grid of the video amplifier, following the detector, is therefore capable of being driven below cut-off by a large negative pulse at the detector output. The video amplifier can, of course, recognize voltage changes only above the cut-off voltage level, but if the negative pulse at the detector output-video amplifier input is not too large as, for instance, illustrated by the solid line pulse of Fig. 2*b*, the resultant output from the video amplifier will be approximately the same as that of the input pulse, e. g., of width I, and no pulse stretching is produced. However, if the detector output should be increased to the level indicated by the dotted wave shape, it is obvious that the output of the video amplifier stage to whose grid a pulse of this waveform was applied would be a wider pulse than that of the weaker signal, since, as pointed out above, the tube can only recognize voltage changes above the cut-off voltage level. Thus the output pulse of this tube would be of width II, although the true width of the input pulse applied to its grid was only width I.

In Fig. 1 is shown a portion of a multi-I.-F. stage pulse receiver including a control circuit according to this invention for overcoming or preventing pulse stretching of both types outlined above. The first two electron tubes 20 and 21 represent the last two I.-F. stages of the I.-F. amplifier, and the output of the last I.-F. stage tube 21 is detected in detector tube 22 before being applied to the first video amplifier tube 23. The output of video amplifier 23 is connected through cathode follower 24 and buffer stage 25 to the successive video amplifiers or any other desired circuits of the receiver, or the output of buffer stage 25 may be used directly as the receiver output. The output of cathode follower 24 is also fed to control tube 26, and the output of tube 26, taken from its cathode, is fed back to the cathodes of I.-F. tubes 20 and 21, which cathodes are connected in parallel as shown.

More specifically, the output from the previous I.-F. stage of the receiver is fed through coupling condenser 30 to the grid of I.-F. tube 20, which may be a type 6AK5 pentode. The grid of this tube is also connected to ground through a grid choke 31, and a crystal diode 32, which may be a type 1N34, is connected in parallel with this grid choke 31 to prevent overloading of the final I.-F. stages 20 and 21 in the event that signals 60 db or more stronger than the minimum usable input are received. The cathodes of I.-F. tubes 20 and 21 are connected together and to their respective suppressor grids, and to ground through a relatively small resistance 33, for example, 120 ohms. Each cathode is also connected to ground through a very small bypass condenser (34 and 35 respectively), each of whose capacities may be, for instance, 1000 micromicrofarads. The plates of tubes 20 and 21 are connected to a source of positive potential through plate resistors 36 and 37, respectively, and their screen grids are connected to the same source of positive potential through screen resistors 38 and 39, respectively, and to ground through condensers 40 and 41, respectively. The plate of I.-F. tube 20 is connected to the grid of I.-F. tube 21 through coupling condenser 42, and the grid of the latter tube is connected to ground through grid choke 43. The plate of I.-F. tube 21 is connected to the cathode of detector diode 22 through coupling condenser 44, and the cathode of diode 22 is connected to ground through choke 45. The output of detector diode 22, taken from its plate, is connected through a low-pass filter including condenser 46, choke 47, and resistor 48, connected as shown, and thence through coupling condenser 49 to the control grid of first video amplifier 23. The control grid of this tube is also connected to ground through grid resistor 50, and its cathode and suppressor grid are connected together and directly to ground. The screen grid of video amplifier 23 is connected to the above-mentioned source of positive potential through screen resistor 51 and to ground through condenser 52. The plate of tube 23 is connected to the same source of positive potential through plate resistor 53, and to the grid of cathode follower 24 through coupling condenser 54.

The grid of cathode follower 24 is also connected to ground through grid resistor 55, and its plate and screen grid are connected together and directly to the above-mentioned source of positive potential. The suppressor grid and cathode of tube 24 are connected together and to ground through cathode resistor 56. The output of cathode follower 24, taken directly from its cathode, is connected to the grid of control tube 26 through coupling condenser 57 and to the input of buffer stage 25. The control grid of tube 26 is biased from a source of negative potential through resistor 58 and a voltage divider including resistors 59 and 60. The screen grid and plate of tube 26 are connected together and directly to the above-mentioned source of positive potential, and its cathode and suppressor grid are connected together and to ground through condenser 61, whose capacity may, for instance, be 0.02 microfarad. As above-mentioned, the output of control tube 26, taken from its cathode, is connected back to the cathodes of I.-F. tubes 20 and 21 in parallel, and thus condensers 34, 35, and 61 are effectively in parallel with resistor 33. I.-F. tube 21, like tube 20, may be a type 6AK5 pentode. Diode detector 22 may be one-half of a type 6AL5 tube, and video amplifier 23, cathode follower 24, and control tube 26 may also be type 6AK5 pentodes.

Each directly received signal applied to I.-F. tube 20, and in turn to the last I.-F. stage tube 21, can be considered, in the absence of echoes, to be a pulse consisting of a few hundred cycles of the intermediate frequency. By changing the mutual conductance of either or both tubes 20 and 21 at the time the signal is being amplified, the degree of amplification can be varied. Since in a pentode the mutual conductance or $g_m$ is roughly proportional to the plate current, the desired control over the amplification can be obtained by varying the voltage of either the control grid, the screen grid, or the cathode. In this embodiment the control voltage from control tube 26 is applied to the cathode circuit to vary the cathode voltage for reasons which will be discussed hereinafter.

The envelope of each signal pulse, consisting of a few hundred cycles of the intermediate frequency thus appearing at the plate of tube 21, is extracted in the detector circuit including tube 22 and applied to video amplifier 23 as a negative pulse whose amplitude is dependent upon the strength of the input signal. Because of the limited band width of the detector circuit, even if the receiver input is a perfectly rectangular pulse, the detected envelope will be slightly distorted as illustrated by the solid line waveform of Fig. 2*b*. To avoid additional distortion, such as is shown by the dotted line waveform of Fig. 2*b*, it is necessary to control the amplification of the preceding I.-F. amplifier tubes 20 and 21 such that video amplifier tube 23 will not be driven very much below cut-off. The output of video amplifier 23 is a positive pulse, and this is passed through cathode follower 24 before being connected to control tube 26. Cathode follower 24 is introduced to prevent control tube 26 from having an undesirable loading effect upon the output of video amplifier 23, and buffer stage 25 is preferably included in order to prevent the subsequent circuits from having any effect upon the output of cathode follower 24, particularly when strong pulses are received. Control tube 26 is preferably biased by means of the negative potential applied to the voltage divider comprising resistors 59 and 60 such that approximately 30 volts is applied to its control grid. With this bias a 25-volt positive pulse appearing at the cathode of cathode follower 24 will charge up condenser 61 sufficiently to cause a 3 to 4-volt pulse to appear across the 120-ohm cathode resistor 33 common to I.-F. tubes 20 and 21 and control tube 26. However, a 20-volt positive pulse appearing at the cathode of cathode follower 24 will produce a very insignificant voltage on condenser 61 and cathode resistor 33 for this same bias condition. Thus the signal output voltage applied to buffer stage 25 will vary between 20 and 25 volts, and since 4 volts of cathode bias on I.-F. amplifier tubes 20 and 21 will almost completely desensitize the receiver, the input to buffer stage 25 will not exceed 25 volts for any input condition. It is important to note that this action is obtained by reducing the receiver gain rather than by the conventional procedure of limiting through overdriving an amplifier stage. This is necessary in order that the pulse shape of strong directly-received signals may be preserved.

It was pointed out above that the variation in gain of I.-F. amplifiers 20 and 21 was obtained by variation of their cathode voltage rather than by variation of their control grid or screen grid voltages. There are two reasons for doing this. First, when the cathode of control tube 26 is following its grid in the positive direction, control grid 26 acts as a low-impedance voltage source. This circuit acts as a high-impedance load when the grid goes negative, however. The control voltage appearing across condenser 61 and applied to the cathodes of tubes 20 and 21 can therefore be adjusted to reach equilibrium in less than a microsecond, but to recover its normal or static value with a sufficiently long time constant to insure that echoes will be of negligible amplitude by the time that normal sensitivity of the receiver is restored. The control circuit parameters including the operating characteristics of tube 26, the ohmic value of resistor 33, and the capacities of condensers 34, 35, and 61 should be chosen such that condenser 61 has a time constant of charge of less than 1 microsecond and a time constant of discharge of at least 4 microseconds. Preferably, circuit parameters should be chosen such that the time constant of charge is even less than the above value, and only approximately $\frac{1}{5}$–$\frac{1}{10}$ microsecond.

The other reason for using cathode biasing is connected with the feed-back theory of such a system. Stable operation is obtained if the phase shift of the fed-back voltage is kept less than 180 degrees until the product of the gain through the system times the fraction of output voltage used as feed-back is less than unity. The 0.02 microfarad condenser 61 used for increasing the recovery time constant serves a dual purpose in that in addition it is the controlling factor in setting the phase shift attenuation characteristic of the system. This is because it overrides the other phase shifts involved so as to add stability to the circuit organization. On the other hand, if the control voltage had been applied to the grid rather than to the cathode, this would have added an additional phase inversion in the feed-back path, which would have increased the tendency of the circuit toward instability.

Let us first consider the operation of the circuit when a signal is made up of two components with the first or direct pulse 10 db stronger than any part of the second pulse (which might be a train of echoes). Such a received pulse is shown in line (*a*) of Fig. 3, wherein the direct received signal is 25 db below 1 mw. In line (*b*) of Fig. 3 is shown the detected signal before limiting in the video amplifier, assuming no limiting in the I.-F. stages. Either the first (direct) pulse or the first portion of the second pulse is strong enough to produce a saturated signal in a conventional receiver or, in other words, the resultant output of a conventional receiver would be, as shown in line (*c*) of Fig. 3, a pulse train of approximately 30 volts peak amplitude, which masks the true pulse width of the transmitted signal.

A receiver modified in accordance with Fig. 1 to include the control circuit of this invention, however, can develop sufficient control voltage in the first $\frac{1}{5}$–$\frac{1}{10}$ microsecond of the direct pulse to drop the sensitivity of the receiver to the point where the strong direct pulse produces an output pulse from cathode follower 24 which is just below the saturation point of the video amplifier or, in other words, approximately 25 volts peak amplitude. In line (*d*) is shown the voltage developed by control tube 26, which is of approximately 3 volts peak magnitude. Since this control voltage holds the receiver sensitivity at this level momentarily and then allows it to increase slowly (at the rate of approximately 2 db/microsecond), during the next approximately 5 microseconds after the input signal level drops, a strong echo 10 or more db weaker than the direct pulse will appear at less than $\frac{1}{3}$ saturation level at the output of cathode follower 24, as illustrated in line (*e*) of Fig. 3. This differential in level is ample to define the trailing edge of the first or direct pulse. In line (*f*) is shown for illustrative purposes the receiver gain under the control of the output of control tube 26. Tests have shown that through the use of the circuit of Fig. 1, pulse stretching is reduced to less than $\frac{1}{10}$ microsecond for pulses of from 2 to 16 microseconds, whether followed by echoes or not.

Figure 5:
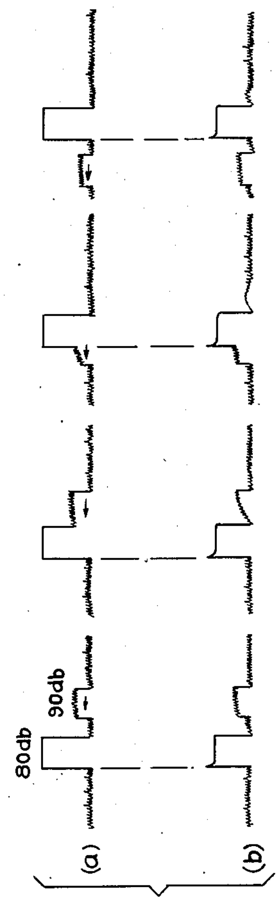
Figure 6:
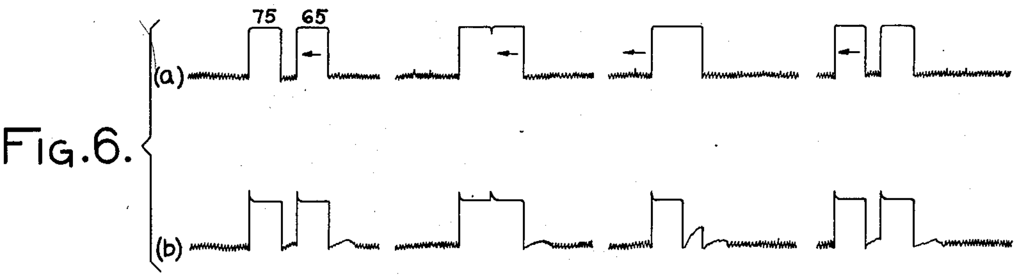
Figure 7:
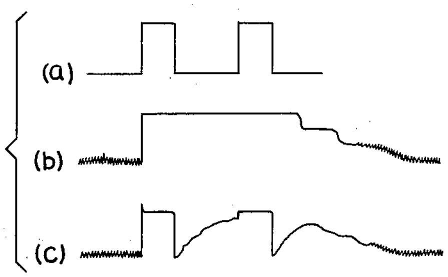

Figs. 4–7 have been prepared to illustrate further the difference in operation between a conventional receiver and a receiver in accordance with Fig. 1 and controlled by control tube 26. In these figures the effect of two signals on each other is shown for various signal strengths as the time relationship between the pulses is shifted. The signals of Figs. 4, 5, and 6 were derived from signal generators and therefore have no echoes of their own. Fig. 7 shows the result if each pulse is followed by echoes. For illustrative purposes, any pulse of these signals of Figs. 4–6 may be considered to have the effect of an echo as long as it is more than 10 db weaker than the initial pulse. However, note that no true echoes could ever have the same effect as those weaker signals of Figs. 4–6 which precede the stronger pulse, inasmuch as echoes are necessarily always received later than the directly-received pulse.

Figure 4:
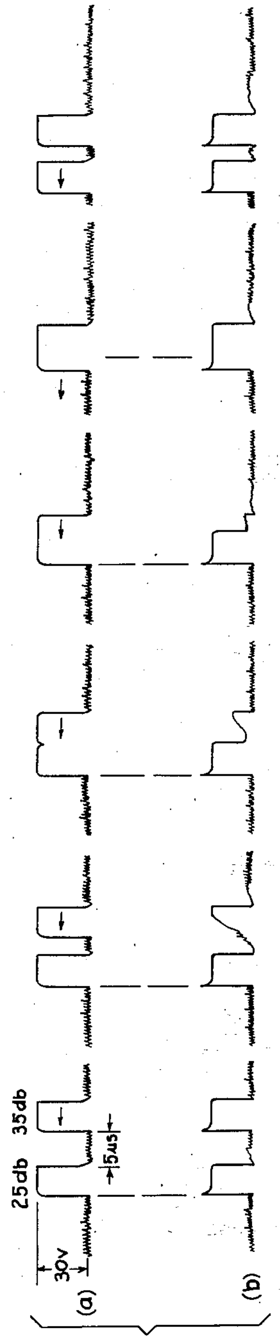

In Fig. 4 is shown the output of a conventional receiver and the output of a receiver in accordance with Figure 1 for a 25 db and a 35 db signal below 1 mw., each being of 30 volts peak amplitude and hence sufficient to drive the video amplifier beyond saturation. Initially, the leading edge of the second (35 db) pulse occurs 5 microseconds later than the trailing edge of the first pulse. As we move to the right with time, the second pulse shifts to the left and begins to pass through the first. In line (*a*) is shown the resultant saturated output of a conventional receiver, and in line (*b*) is shown the comparable resultant output of cathode follower 24 of Fig. 1. Note that as the leading edge of the second pulse merges with the trailing edge of the first pulse, the output of the conventional receiver, as illustrated in line (*a*), appears as merely one large pulse, whereas the comparable output of Fig. 1, taken from the cathode of cathode follower 24, is as shown in line (*b*) and maintains the sharp break at the end of the first or direct pulse.

In Fig. 5 is illustrated similarly the effects of two signals 80 and 90 db, respectively, below 1 mw., and in Fig. 6 is shown the effect of a strong signal crossing through a weaker signal, the second pulse shown initially at the left being 65 db below 1 mw. and the first pulse being 75 db below 1 mw. In both Figs. 5 and 6, line (a) again represents the output of a conventional receiver and line (b) the output at the cathode of cathode follower 24 of Fig. 1.

In Fig. 7 is shown the effect of echoes upon a conventional receiver and a receiver modified in accordance with Figure 1. In line (a) are shown two transmitted signals. In line (b) is shown the output of a conventional receiver wherein the first transmitted signal received is sufficient to drive the receiver beyond saturation, and it remains in this condition until after the second pulse has been received because of the intervening echoes also received. Thus the output waveform is saturated for a substantial period, as shown in line (b), and it is impossible to tell the width of the initial pulse received. In line (c) is shown the output at cathode follower 24 of Fig. 1, and as shown, both the width of the first and the second transmitted pulses are distinguished from the intervening and successive echoes by this circuit.

While in the preferred embodiment illustrated in Fig. 1 the grid of control tube 26 has been shown as connected to the output of video amplifier 23 through cathode follower 24, and the receiver output connection is isolated from cathode follower 24 by means of buffer stage 25, in some instances either or both buffer stage 25 and cathode follower 24 might be eliminated. If buffer stage 25 is eliminated, the load impedance connected to the receiver output may be such that when a strong pulse is received, it causes the peaks of the output of cathode follower 24 to be clipped, so that the control tube 26 does not provide a feed-back independent of the loading of the receiver. Where this effect is not of importance or where strong signals are not expected, buffer stage 25 may be omitted. Also, cathode follower 24 may be omitted and the output of video amplifier 23 coupled through condenser 54 to the grid of control tube 26. However, this arrangement has the drawback that control tube 26 may be overdriven and caused to draw grid current upon the reception of a strong pulse. This in turn overloads the preceding video amplifier 23 and distorts the output of the receiver. However, again, if a small amount of distortion is unimportant or if strong signals are not expected, cathode follower 24 may also be omitted.

Numerous additional applications of the above-disclosed principles will occur to those skilled in the art, and no attempt has been made to exhaust such possibilities. The scope of this invention is defined in the following claims.

What is claimed is:

1. In an amplifier for pulse width detecting systems constructed to avoid pulse stretching, an amplifier tube including a cathode, an anode and a grid, said grid having input signal pulses supplied thereto, a bias resistor connected to be common to the cathode and grid circuits of said amplifier tube, a control tube including a cathode, an anode and a grid, circuit means supplying an input to the grid of said control tube varying in accordance with the output of said amplifier tube, circuit means causing said grid to be normally biased beyond cutoff to require an input of a predetermined value before said control tube can give an output, a capacitor connected in the cathode circuit of said control tube without a limiting resistor in the output plate circuit of said control tube to permit said capacitor to rapidly receive a charge at the beginning of each received signal pulse in accordance with the amplitude of that pulse when it rises above a predetermined value, and circuit means connecting said capacitor in multiple with said bias resistor of said amplifier tube to reduce the gain of said amplifier in accordance with the charge on said capacitor and to permit said capacitor to slowly discharge through said bias resistor after the termination of each signal pulse for restoring the gain of said amplifier to normal after a limited time, whereby said capacitor is charged rapidly through said control tube in response to each input pulse and remains charged for the duration of each such pulse to thereby reduce the gain of said amplifier tube, and whereby said capacitor discharges slowly through said bias resistor after the termination of each input pulse to thereby cause the gain of said amplifier tube to slowly return again to its normal value during a limited time in which echo pulses might be received.

2. In an amplifier for pulse width detecting systems constructed to avoid pulse stretching, an amplifier tube including a cathode, an anode and a grid, said grid having input signal pulses of varying widths applied thereto, a bias resistor connected to be common to the cathode and grid circuits of said amplifier tube, a control tube including a cathode, an anode and grid, circuit means causing said grid to have a normal bias such as to require an input above a predetermined value in order for said control tube to supply an output, circuit means coupling said grid of said control tube to the anode of said amplifier tube to supply said control tube with an input varying in accordance with the output of said amplifier tube, a capacitor connected in the cathode circuit of said control tube, said capacitor being of such a value and the output circuit of said control tube having such a low ohmic resistance as to permit said capacitor to be quickly charged at the beginning of each signal pulse to a value depending upon the amount that the received signal pulse causes the output of said amplifier tube to exceed said predetermined input required for said control tube regardless of the rate of rise of said signal pulse, and circuit means connecting said capacitor in multiple with said bias resistor of said amplifier tube to reduce the gain of said amplifier tube in accordance with the charge on said capacitor and to cause the gain of said amplifier to remain reduced during the time said capacitor is discharging through said bias resistor following the termination of each signal pulse, whereby the output of said amplifier is of substantially the same amplitude for each signal pulse and is of a duration substantially corresponding to the duration of the input signal pulse, and whereby the reception of an echo input pulse for a limited time after a signal pulse fails to cause said amplifier to give any substantial output.

FRANK P. ZAFFARANO.

References Cited in the file of this patent

UNITED STATES PATENTS

| Number | Name | Date |
|---|---|---|
| 2,259,860 | Rinia | Oct. 21, 1941 |
| 2,273,193 | Heising | Feb. 17, 1942 |
| 2,427,691 | Prichard | Sept. 23, 1947 |